United States Patent [19]

Sasaki et al.

[11] Patent Number: 4,815,436
[45] Date of Patent: Mar. 28, 1989

[54] APPARATUS FOR PREVENTING THE OUTLFOW OF A FUEL FROM A FUEL TANK FOR VEHICLE

[75] Inventors: Michiaki Sasaki, Hatano; Haruo Mochida, Kiyokawa; Tetsuzi Nasu, Yokohama, all of Japan

[73] Assignee: Nissan Motor Co., Ltd., Yokohama, Japan

[21] Appl. No.: 900,411

[22] Filed: Aug. 26, 1986

[30] Foreign Application Priority Data

Sep. 2, 1985 [JP] Japan .................................. 60-193349

[51] Int. Cl.⁴ ............................................. F02M 33/02
[52] U.S. Cl. ....................................... 123/520; 141/94; 137/51; 220/85 VR
[58] Field of Search ................ 123/518, 519, 520, 521; 137/43, 51, 154; 141/5, 4, 94; 220/1 V, 85 F, 85 VR, 85 VS, 86 R

[56] References Cited

U.S. PATENT DOCUMENTS

| | | | |
|---|---|---|---|
| 4,100,758 | 7/1978 | Mayer | 220/85 VR X |
| 4,646,772 | 3/1987 | Bergsma | 220/202 X |
| 4,659,346 | 4/1987 | Uranishi et al. | 220/85 VS X |

OTHER PUBLICATIONS

The Random House College Dictionary, Rev. Ed., (1980), p. 19.

Primary Examiner—Werner H. Schroeder
Attorney, Agent, or Firm—Foley & Lardner, Schwartz, Jeffery, Schwaab, Mack, Blumenthal & Evans

[57] ABSTRACT

An apparatus for preventing the outflow of a fuel from a fuel tank for vehicle comprises a vent tube device connected to the fuel tank and a canister device connected to the inlet system of an engine to supply the fuel into the tank, an evaporating tube device separated from the vent tube device and connected to the fuel tank and the canister device to supply the evaporated fuel within the tank to the canister device, a shut-off valve disposed in the vent tube device to pass and interrupt the fuel flow through the vent tube device, an opener switch for detecting the opening and closing states of a lid opener opening and closing a filler lid for supplying the fuel into the fuel tank, and a control device for controlling the opening and closing of the shut-off valve by the opener switch to open the shut-off valve only in the open state of the lid opener.

7 Claims, 2 Drawing Sheets

4,815,436

APPARATUS FOR PREVENTING THE OUTLFOW OF A FUEL FROM A FUEL TANK FOR VEHICLE

BACKGROUND OF THE INVENTION

The present invention relates to an apparatus for preventing a fuel within a fuel tank for vehicle from flowing out of the fuel tank.

In a fuel tank for vehicle such as automobile, an evaporated fuel generated within the fuel tank is supplied to a canister where the evaporated fuel is absorbed. The evaporated fuel is supplied by the canister to the inlet system of an engine together with purge air. When the fuel is supplied into the vehicle, the evaporated fuel tends to flow out of the filler port of a filler tube, thereby contaminating the atmospheric air. To solve this problem, it has been recently proposed to communicate a vent tube for regulating the full level of the fuel to a canister which vents to the atmosphere and to seal the circumference of the inserted portion of a feed oil gun inserted into the filler port of the filler tube so that the fuel oil is fed into the fuel tank without any problems and the evaporated fuel is completely prevented from flowing out of the fuel tank via the filler tube.

In such a conventional vehicle, when the fuel oil is supplied into the fuel tank, the vent action by the vent tube is secured through the canister and the outflow of the evaporated fuel from the filling port of the filler tube is prevented. The evaporated fuel generated within the tank is fed to canisters through the vent tube and an evaporating tube separated from the vent tube. The evaporaed fuel is fed by the canisters to the inlet system of an engine together with a purge air.

When the fuel is supplied into the tank by the feed oil gun, the fuel level in the tank is regulated by blocking the end of the vent tube on fuel oil surface. The fuel is flowed into the vent tube by the difference between the fuel levels in the tank and the filler tube until the fuel level of the vent tube has reached the same level as the fuel level of the filler tube. The fuel in the vent tube tends to flow-into its canister due to vibration of the vehicle etc. during its running so that the fuel cannot be sufficiently absorbed by the canister for the vent tube and may be leaked from the canister.

SUMMARY OF THE INVENTION

To overcome the problems mentioned above, an object of the present invention is to provide an apparatus for preventing the outflow of a fuel from a fuel tank for a vehicle which communicates the tank through the vent tube to a cannister only the during the supplying of fuel to the vehicle.

Another object of the present invention is to provide an apparatus for preventing the outflow of a fuel from a fuel tank for vehicle by preventing the excess outflow of the evaporated fuel from the fuel tank.

To accomplish the above objects, the present invention provides an apparatus for preventing the outflow of a fuel from a fuel tank for vehicle, the apparatus comprising vent tube means connected to the fuel tank and canister means connected to the inlet system of an engine to supply the evaporated fuel into the engine, evaporating tube means separated from the vent tube means and connected to the fuel tank and the canister means to supply the evaporated fuel within the tank to the canister means, a shut-off valve disposed in the vent tube means to pass the interrupt the fuel flow through the vent tube means, an opener switch for detecting the opening and closing states of a lid opener opening and closing a filler lid for supplying the fuel into the fuel tank, and control means for controlling the opening and closing of the shut-off valve of the opener switch to open the shut-off valve only in the opening state of the lid opener.

DETAILED DESCRIPTION OF THE PREFERRED EMBODIMENTS

Figure 1:
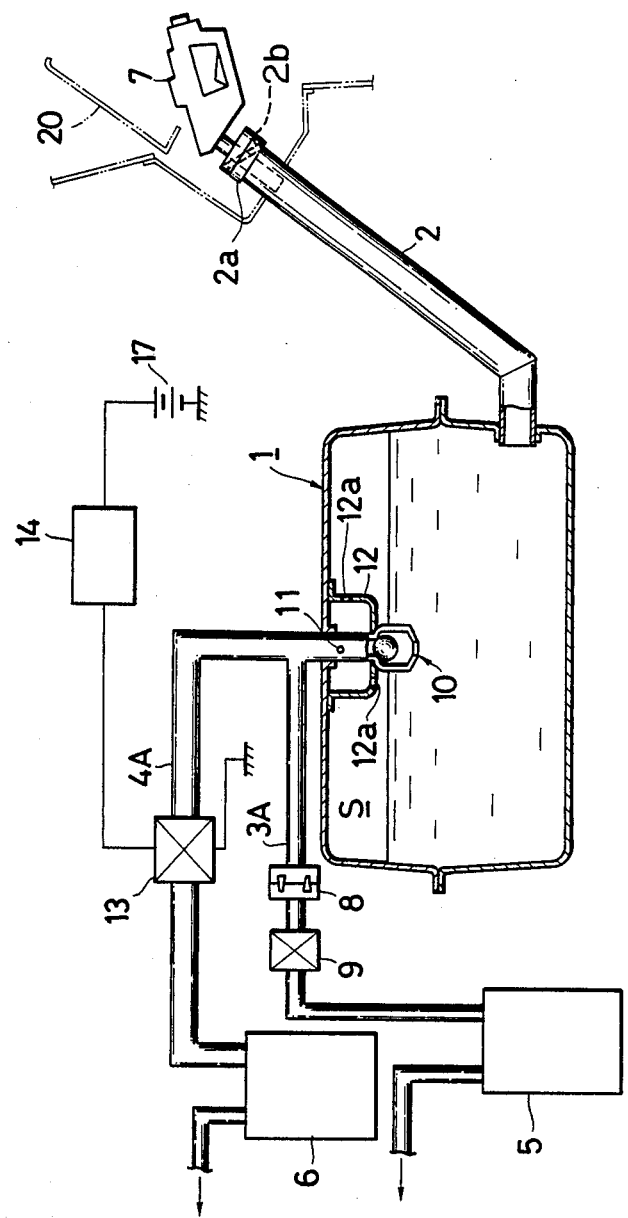
FIG. 1 is a schematic sectional view showing an apparatus for preventing the outflow of a fuel from a fuel tank for vehicle according to one embodiment of the present invention.
Figure 2:
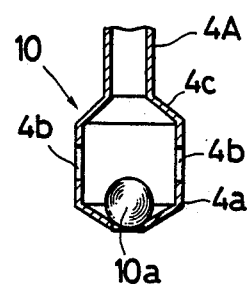
FIG. 2 is a sectional view of a float valve shown in FIG. 1.
Figure 3:
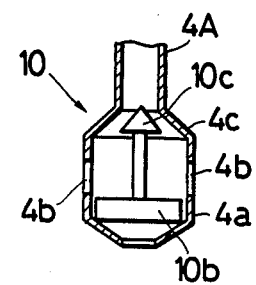
FIG. 3 is a sectionl view in another embodiment of the float valve of FIG. 1.
Figure 4:
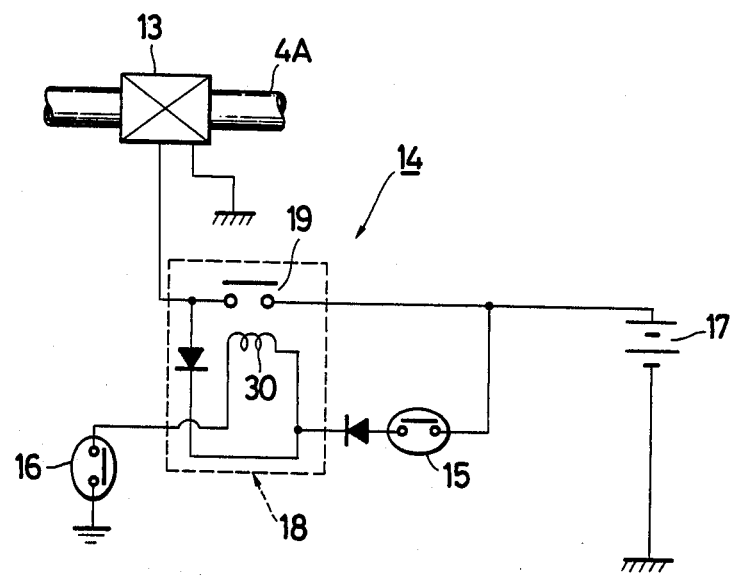
FIG. 4 is a diagram of an electrical circuit of a detecting device for detecting the feed oil state of the vehicle.

In FIG. 1, a filler tube 2 is connected to a fuel tank 1 to supply fuel oil to the tank 1 and is provided with a supply port 2a at one end thereof for receiving a feed oil gun 7. A vent tube 4A is connected to the tank 1 and a canister 6 to vent the tank 1 to the atmosphere. The vent tube 4A is projected into the tank 1 at one end thereof. An evaporating tube 3A is branched from the vent tube 4A and connected to a canister 5 for receiving the evaporated fuel within the tank 1 through the evaporating tube 3A. A float valve 10 is connected to the projected end of the vent tube 4A within the tank 1 and is closed to block the vent tube 4A when the fuel level within the tank 1 has reached a predetermined level. As shown in FIG. 2, the float valve 10 has a large diameter portion 4a, formed at the projected end of the vent tube 4A a through hole 4B extending through the circumferential wall of the large diameter portion 4a, and a ball-shaped valve element 10a disposed within the large diameter portion 4a to block the vent tube 4A. FIG. 3 shows another embodiment of the float valve 10 in which the float valve 10 has the large diameter portion 4a formed at the projected end of the vent tube 4A, a float element 10b and a needle valve element 10c connected to the float element 10b which is disposed within the large diameter portion 4a to block the vent tube 4A. An air hole 11 is formed in the upper portion of the projected end of the vent tube 4A and is surrounded by a separator 12 having through holes 12a extending through the circumferential and bottom walls thereof. A two-way valve 8 is attached to the evaporating tube 3A to prevent the pressure within the fuel tank 1 from being less than the atmospheric pressure. The two-way valve 8 passes the evaporated fuel in the tank 1 to the canister 5 to prevent an excess gas vent or outflow from the tank only when the pressure of the evaporated fuel within the tank 1 has increased and reached a predetermined pressure. A roll-over valve 9 is attached to the evaporating tube 3A and has a float valve element therein to interrupt the evporating tube 3a when the vehicle is turned over, thereby preventing the outflow of the fuel from the evaporating tube 3A. A shut-off valve 13 which is opened by the detecting action of a detector 14 in a manner described shortly is attached to a portion of the vent tube 4A on the side of the canister 6 towards the branched portion of the vent tube 4A and the evaporating tube 3A. A normally-open electromagnetic valve is used as the shut-off valve 13 in the present invention. As shown in FIG. 4, the detector 14 has an opener switch 15 actuated by the opening operation of an unillustrated well known lid opener which opens and closes a filler lid 20 disposed on the compartment side of the vehicle, and by a speed detecting switch 16 which detects braking of the vehicle and is actuated when the speed of the vehicle is 0 km/h. The opener switch 15 and the speed detecting switch 16 are combined with each other to detect the fuel supplying state as described later. When the fuel is supplied into the vehicle, the vehicle is stopped and the filler lid 20 is opened by the lid opener; this state can be seen as the fuel supplying state. The opener switch 15 is electrically connected in series to the speed detecting switch 16 through an electromagnetic coil 30. When these switches 15 and 16 are actuated, i.e., ON, a voltage is applied by a battery 17 to the electromagnetic valve 13, thereby opening the electromagnetic valve 13. After the filler lid 20 is opened and an operator removes his hand from the filler lid 20, the lid opener is automatically returned from the open state to the closed state so that the opener switch 15 is deactuated, i.e., it is turned OFF. Accordingly, a self-holding circuit 18 is disposed between the opener switch 15 and the speed detecting switch 16 to maintain the open state of the electromagnetic valve 13 once the opener switch 15 and the speed detecting switch 16 are actuated to open the electromagnetic valve 13 and thereafter the opener switch 15 becomes OFF. The self-holding circuit 18 opens a relay contact 19 thereof by the electromagnetic coil 30 to close the electromagnetic valve 13 when the feed of fuel is completed and the speed detecting switch 16 is switched OFF in accordance with the starting of the vehicle.

According to the construction of the apparatus mentioned above, when the vehicle is stopped and the lid opener is opened to open the filler lid 20 so that fuel oil can be supplied to the vehicle, the speed switch 16 and the opener switch 15 are actuated, i.e., they are switched ON, so that the electromagnetic valve 13 is opened and the vent tube 4A thereby opened. Since the vent tube 4A is communicated with the atmospheric air through the canister 6, the vent action of the vent tube 4A is sufficient for the fuel supply operation so that fuel can be smoothly fed into the tank 1 if the circumference of the portion of the feed oil gun 7 inserted into the supply port 2a of the filler tube 2 is sealed by means of a seal member 26 which prevents the outflow of the evaporated fuel from the supply port 2a of the filler tube 2. When the fuel is supplied to the tank 1, the evaporated fuel remaining in the upper space S within the tank 1 is fed from the float valve 10 to the canisters 6 and 5 through the vent tube 4A and the evaporating tube 3A, respectively, until the float valve 10 is closed. The evaporated fuel adsorbed in the canisters 6 and 5 is fed to an engine inlet system (not shown) together with purge air. When the fuel level within the tank 1 has reached a predetermined level, the float valve 10 is closed to reliably regulate the full level of the fuel. Even when the fuel is supplied into the tank to a level near the neck portion of the filler tube 2 after a full level of the fuel already exist, the projected end of the vent tube 4A within the tank 1 is closed by the float valve 10 so that the fuel does not flow into the vent tube 4A. After the supplying of fuel is completed, the filler lid 20 is closed, the vehicle is started and, the speed detecting switch 16 is turned OFF so that the relay contact 19 is opened by the electromagnetic coil 30 and the electromagnetic valve 13 is thereby closed, so that further venting through tube 4A is prevented.

When the float valve 10 is closed, the evaporated fuel generated in the upper space S of the tank 1 flows through holes 12a of the separator 12, and the air hole 11 into the projected end of the vent tube 4A within the tank 1. The evaporated fuel is thus fed to the canister 5 through the evaporator tube 3A. When the fuel level within the tank 1 is reduced from the predetermined level and the float valve 10 is thereby opened, the evaporated fuel is fed to the canister 5 through the float valve 10 and the evaporating tube 3A. Accordingly, the evaporated fuel in the tank 1 is supplied through only the evaporating tube 3A and not through the vent tube 4A since the vent tube 4A is closed by the electromagnetic valve 13, thereby preventing the excess venting of the evaporated fuel from the tank.

When the fuel oil within the tank 1 is vibrated during the running of the vehicle such as, for example, when the vehicle travels a corner of a road, the float valve 10 is closed by motion of the fuel and, thereby preventing the fuel from flowing into the projected end of the vent tube 4A. Further, even when the separator 12 is covered by the fuel, the through holes 12a regulate the fuel flow into the separator 12 so that the flow of the fuel from the through hole 11 into the separator 12 can be prevented, thereby reliably preventing the outflow of the fuel from the evaporating tube 3A due to the vibration of the fuel. In addition, the shoulder portion 4c of the large diameter portion 4a constituting the casing of the float valve 10 desirably has a slanting angle greater than the maximum slanting angle of the fuel surface such that the float valve element 10a or the needle valve element 10c is reliably guided toward the projected end of the vent tube 4A within the tank 1 even when the fuel surface within the tank 1 is inclined by the maximum slanting angle and approaches the shoulder portion 4c, on the corner of a road.

When the vehicle is turned over, for example, and the float valve 10 is opened, the fuel within the tank 1 is flowed into the vent tube 4A through the float valve 10. However, the electromagnetic valve 13 is in a closed state, and the outflow of the fuel from the vent tube 4A is reliably prevented. Further, fuel flow flowing from the branched portion of the vent tube 4A through the evaporating tube 3A into the canister 5 is prevented since the roll-over valve 9 is closed by the turning over of the vehicle.

In the above embodiment, the evaporating tube is branched from the vent tube, and the float valve and the separator are disposed at the projected end of the vent tube within the tank. However, the present invention can be applied to an apparatus in which the vent tube and the evaporating tube are independently disposed and the float valve and the separator are not disposed at the projected end of the vent tube within the tank.

As mentioned above, according to the present invention, when the fuel is supplied to the tank, vent action is assured by the opening of a shut-off valve device and the vent action is stopped by the shut-off valve device when the vehicle is running. Accordingly, the fuel can be prevented from flowing from the vent tube through the canister toward the exterior. Furthermore, even when the vehicle is turned over, the fuel does not flow out of the vent tube, thereby preventing the contamination of the atmospheric air and increasing improving the safety and the useful life of the apparatus.

What is claimed is:

1. An apparatus for preventing the outflow of fuel from a fuel tank which is in a vehicle having an engine, a filler tube with a filler lid connected to the fuel tank to supply the fuel into the fuel tank, and an evaporating tube for connecting the fuel tank to an inlet system of the engine through a first canister to supply the fuel into the engine after evaporation in the fuel tank, the apparatus comprising:
- a second canister;
- a vent tube extending into the fuel tank for connecting the fuel tank to the inlet system of the engine through the second canister, for supplying through the vent tube and the second canister into the engine fuel evaporated in the fuel tank;
- a shut-off valve disposed to open and close in the vent tube between the second canister and the fuel tank;
- a seal member provided in the filler tube for preventing the fuel flowing out of the filler tube to the atmosphere; and
- control means for controlling the opening and closing of the shut-off valve,
- the control means comprising an opener switch for detecting whether the filler lid is open or closed, and a speed detecting switch for detecting whether the vehicle is stopped or moving, and means for opening the shut-off valve to pass the evaporated fuel when the filler lid is detected to be open and the vehicle is detected to be stopped and for closing the shut-off valve to interrupt the fuel when the vehicle is detected to be moving.

2. The apparatus of claim 1, wherein the control means includes a self-holding circuit electrically connected to the opener switch and the speed detecting switch to hold the shut-off valve open until the vehicle is detected to be moving after the shut-off valve is opened.

3. The apparatus of claim 1, wherein the vent tube further comprises a float valve disposed within the fuel tank to block the vent tube when liquid fuel supplied from the filler tube has reached a predetermined level in the fuel tank, whereby liquid fuel is prevented from entering the vent tube.

4. The apparatus of claim 3, wherein the vent tube includes a through-hole located above the float valve and opening into the fuel tank, for permitting evaporated fuel to enter the vent tube, and wherein the evaporating tube branches off the vent tube at a portion downstream of the through hole.

5. The apparatus of claim 4, further comprising a separator provided in the fuel tank and surrounding the vent tube at the through hole and having an air hole for introducing evaporated fuel in the fuel tank into the separator.

6. The apparatus of claim 1, wherein the vent tube and the second canister are larger in size than the evaporating tube and the first canister.

7. A fuel supply system for use in a vehicle having an engine which in turn includes an inlet system, comprising:
- a fuel tank for accommodating a liquid fuel and wherein a portion of the liquid fuel evaporates;
- a filler tube with a filler lid connected to the fuel tank to supply the liquid fuel into the fuel tank;
- a first canister;
- an evaporating tube connecting the fuel tank to the inlet system of the engine through the first canister to supply into the engine fuel evaporated in the fuel tank;
- a second canister;
- a vent tube extending into the fuel tank and connecting the fuel tank to the inlet system of the engine through the second canister, for supplying into the engine fuel evaporated in the fuel tank;
- a shut-off valve disposed to open and close in the vent tube between the second canister and the fuel tank;
- a seal member provided in the filler tube for preventing fuel from flowing out of the filler tube to the atmosphere;
- control means for controlling the opening and closing of the shut-off valve,
- the control means comprising an opener switch for detecting whether the filler lid is open or closed, a speed detecting switch for detecting whether the vehicle is stopped or moving, and means for opening the shut-off valve to pass the evaporated fuel when the filler lid is detected to be open and the vehicle is detected to be stopped and for closing the shut-off valve to interrupt the fuel when the vehicle is detected to be moving; and
- a float valve disposed at the vent tube within the fuel tank to block the vent tube when liquid fuel supplied from the filler tube has reached a predetermined level in the fuel tank, whereby liquid fuel is prevented from entering the vent tube.

* * * * *